UNITED STATES PATENT OFFICE.

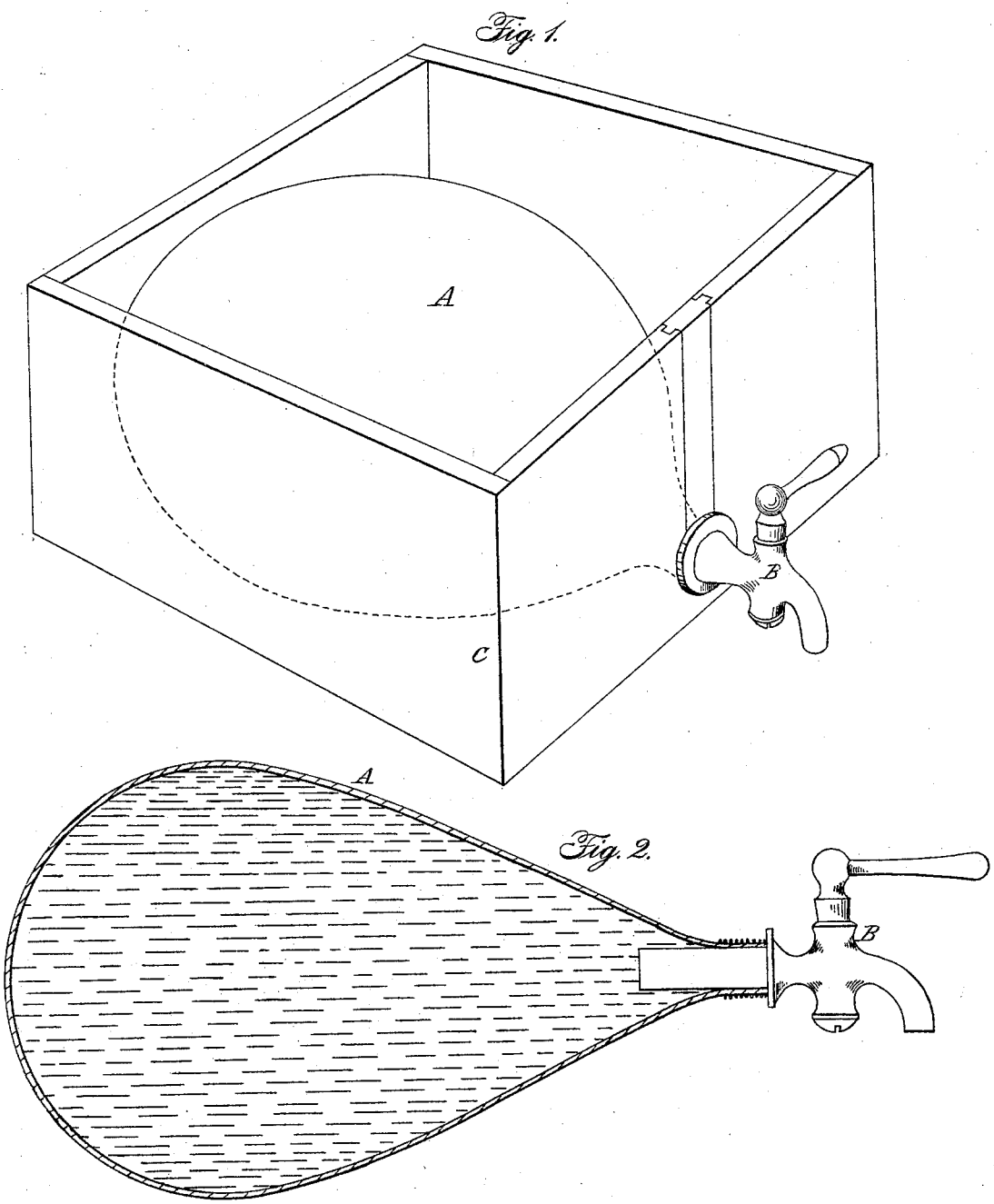

THOS. BYRNE, OF NEW YORK, N. Y.

IMPROVED APPARATUS FOR PRESERVING BEER AND OTHER LIQUIDS.

Specification forming part of Letters Patent No. 50,085, dated September 19, 1865.

*To all whom it may concern:*

Be it known that I, THOMAS BYRNE, of the city, county, and State of New York, have invented a new and useful Improvement in Preserving Liquors or Liquids on Draft; and I do hereby declare that the following is a full, clear, and exact description of the same, reference being had to the accompanying drawings, forming part of this specification, in which—

Figure 1 is a perspective view of the apparatus I use for carrying out my invention, arranged in a box or frame. Fig. 2 is a sectional view of the same disconnected from the box, but filled with liquor.

Similar letters of reference in the two figures indicate corresponding parts.

The nature of my invention consists in the preservation of liquids or liquors on draft by the application of a flexible vessel for the purpose of containing the same.

By means of my invention liquors can be drawn off at various times without letting the carbonic-acid gas escape from said liquors or without causing the necessity of letting atmospheric air come in contact with said liquors during the time of drawing them off from the vessel in which they are contained.

What I mean by the term "liquors on draft" is when liquors are drawn from a vessel to be sold by retail or for family use.

It is a well-known fact that water cannot be drawn out of any inflexible water-tight vessel—for instance, such as a beer-barrel—without letting air into said barrel. This is due to the fact that a vacuum is formed in said barrel by the withdrawal of the water. When ale, porter, beer, or any fermented liquors are fresh and good they part with their carbonic-acid gas in order to fill up the vacuum caused by drawing such liquors out of a barrel, much to the injury of said liquors, and when these liquors have no more carbonic-acid gas to part with air has to be admitted through a vent-hole, which converts a portion of these liquors into acetic acid and renders it unfit for use as a drinking-beverage.

To overcome the above difficulty I employ flexible vessels instead of such as are inflexible, in substantially the following manner:

A is a vessel of any suitable form, made preferably of vulcanized rubber. This vessel is air and water tight, and at one end, as represented, is furnished with a faucet, B, of any suitable construction, which will answer as a means by which to charge and empty the vessel.

In charging the vessel with liquor or liquid the air is to be expelled by collapsing the said vessel, and then the liquor is to be pumped into the vessel, a suitable hose-connection being formed between the pump and the faucet B.

The flexible apparatus described is to be placed, or may be placed, in a suitable box, C, which is provided with a movable cover, which is so applied that it will rise and fall within the box. Upon this cover a weight or a spring may be made to act in order to exert a pressure upon the vessel, so that the liquor may be discharged at a point above the level of the vessel, but when the liquor is to be drawn off on the level of the vessel the atmospheric pressure will be sufficient to avoid the necessity of admitting air into the vessel through a vent-hole.

I have described and represented one mode of carrying out my invention; but I do not wish to be understood as limiting myself to this particular style of apparatus, as it is obvious that many modifications thereof may be made without departing from the principle of operation involved. For instance, the vessel might be made of a form and character similar to a bellows, or with two solid barrel-heads and flexible body or sides, and, as to the material of which it is composed, it might be made of water-proof leather, water-proof cloth, or any other suitable flexible material.

What I claim as my invention, and desire to secure by Letters Patent, is—

1. The preservation of liquids or liquors on draft, substantially as and for the purposes herein set forth.

2. The application of a flexible vessel for containing and from which to serve liquors on draft, substantially as described.

THOS. BYRNE.

Witnesses:
LOUIS SCHADE,
EDW. SCHAFER.